(12) United States Patent
Brunner et al.

(10) Patent No.: US 7,096,041 B2
(45) Date of Patent: Aug. 22, 2006

(54) BEAM FORMING METHOD

(75) Inventors: Christopher Brunner, San Francisco, CA (US); Martin Haardt, Geraberg (DE); Joachim Hammerschmidt, Germering (DE); Alexander Seeger, Feldkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 393 days.

(21) Appl. No.: 10/296,546

(22) PCT Filed: May 17, 2001

(86) PCT No.: PCT/DE01/01883

§ 371 (c)(1),
(2), (4) Date: Apr. 3, 2003

(87) PCT Pub. No.: WO01/91323

PCT Pub. Date: Nov. 29, 2001

(65) Prior Publication Data

US 2003/0144032 A1 Jul. 31, 2003

(30) Foreign Application Priority Data

May 25, 2000 (DE) ................................ 100 26 077

(51) Int. Cl.
*H04B 1/38* (2006.01)
*H04M 1/00* (2006.01)

(52) U.S. Cl. ...................... 455/562.1; 455/73; 455/509; 342/368; 342/373; 370/329; 370/342

(58) Field of Classification Search ............... 455/67.4, 455/509, 562, 73, 562.1; 370/329, 342; 375/324; 342/368, 373

See application file for complete search history.

(56) References Cited

U.S. PATENT DOCUMENTS

| | | | |
|---|---|---|---|
| 4,965,732 A | 10/1990 | Roy, III et al. | |
| 5,471,647 A | 11/1995 | Gerlach et al. | |
| 5,634,199 A | 5/1997 | Gerlach et al. | |
| 5,886,988 A * | 3/1999 | Yun et al. | 370/329 |
| 5,999,800 A * | 12/1999 | Choi et al. | 455/73 |
| 6,154,661 A * | 11/2000 | Goldburg | 455/562 |
| 6,225,948 B1 | 5/2001 | Baier et al. | |
| 6,317,612 B1 * | 11/2001 | Farsakh | 455/67.11 |
| 6,697,633 B1 * | 2/2004 | Dogan et al. | 455/509 |
| 2001/0031022 A1 * | 10/2001 | Petrus et al. | 375/324 |

FOREIGN PATENT DOCUMENTS

DE 198 03 188 A1 7/1999

(Continued)

OTHER PUBLICATIONS

A. Paulraj, et al., "Space-Time Processing for Wireless Communications", IEEE Signal Processing Magazine, Nov. 1997, pp. 49-83.

(Continued)

*Primary Examiner*—Nay Maung
*Assistant Examiner*—Tuan H. Nguyen
(74) *Attorney, Agent, or Firm*—Staas & Halsey LLP

(57) ABSTRACT

In a radio communication system, a beam is formed between subscriber stations and a base station which has an antenna device with several antenna elements. The antenna elements emit a downlink signal based on respective weighing with coefficients of a weighting vector. A plurality of weighting vectors are determined at the subscriber station in an initialization phase and transmitted to the base station. In a subsequent working phase, the subscriber station selects a dominant weighting vector from the weighting vectors and transmits a designation of the selected weighting vector to the base station.

18 Claims, 6 Drawing Sheets

FOREIGN PATENT DOCUMENTS

| | | | |
|---|---|---|---|
| EP | 970 388 | B1 | 1/2000 |
| GB | 2 313 237 | A | 11/1997 |
| GB | 2 313 261 | A | 11/1997 |
| WO | 98/43106 | | 10/1998 |

OTHER PUBLICATIONS

R. Schmalenberger, et al., "A Comparison of Two Different Algorithms for Multiantenna C/I Balancing" European Personal Mobile Communications Conference (EPMCC) Sep. 1997, pp. 483-490.

M. Raitola et al., "Transmission Diversity in Wideband CDMA", IEEE Vechicular Technology Conf., Spring 1999, pp. 1545-1549.

A. M. Earnshaw et al., "An Error Analysis of Feedback Correlation Beamforming for the IS-95 Reverse Link", 1998 IEEE International Conference, pp. 1046-1052.

J. Liang et al., "Forward Link Antenna Diversity Using Feedback for Indoor Communication Systems", International Conference on Acoustics, May 9-12, 1995, pp. 1753-1755.

* cited by examiner (Stand der Technik)

BEAM FORMING METHOD

CROSS REFERENCE TO RELATED APPLICATIONS

This application is based on and hereby claims priority to German Application No. 100 26 077.2 filed on May 25, 2000, the contents of which are hereby incorporated by reference.

BACKGROUND OF THE INVENTION

The invention relates to a method for beamforming in a radio communications system having a base station whose associated antenna device has a number of antenna elements, so that spatial resolution is possible in the beamforming.

In radio communications systems, messages (speech, picture information or other data) are transmitted via transmission channels by electromagnetic waves (radio interface). The transmission takes place both in the downlink direction from the base station to the subscriber station and in the uplink direction from the subscriber station to the base station.

Signals which are transmitted using electromagnetic waves are subject, inter alia, to disturbances due to interference during their propagation in a propagation medium. Disturbances caused by noise may be caused, inter alia, by noise in the input state of the receiver. Due to diffraction and reflections, signal components pass over different propagation paths. Firstly, this means that a signal can arrive at the receiver more than once, in each case from different directions, with different delays, attenuations and phase angles, and, secondly, components of the received signal may be superimposed coherently with changing phase relationships in the receiver, leading to cancellation effects on a short-term timescale (fast fading) there.

DE 197 12 549 A1 discloses the use of intelligent antennas (smart antennas), that is to antenna arrangements having a number of antenna elements, in order to increase the transmission capacity in the uplink direction. These allow the antenna gain to be deliberately aligned in a direction from which the uplink signal is coming.

Various methods for spatial signal separation for the uplink and downlink directions are known from A. J. Paulraj, C. B. Papadias, "Space-time processing for wireless communications", IEEE Signal Processing Magazine, November 1997, pages 49–83.

Particular difficulties occur in the downlink direction, that is to say from the base station to the subscriber station, since the beamforming has to be carried out before the transmitted signals are influenced by the radio channel. An algorithm for beamforming in the downlink direction is known from R, Schmalenberger, J. J. Blanz, "A comparison of two different algorithms for multi antenna C/I balancing", Proc. 2nd European Personal Mobile Communications Conference (EPMCC), Bonn, Germany, September 1997, pages 483–490, which is based on a direct propagation path (visual link) between the base stations and the subscriber stations and iterative calculation of beamforming vectors. The entire, complicated, iterative calculation must be repeated whenever the characteristics of the transmission channel change.

DE 198 03 188 A discloses a method in which a spatial covariance matrix is defined for a link from a base station to a subscriber station. An eigen vector is calculated in the base station from the covariance matrix, and is used as a beamforming vector for that link. The transmission signals for the link are weighted with the beamforming vector and are supplied to antenna elements for emission. Intracell interference is not included in the beamforming process owing to the use of joint detection, for example in the terminals, and any corruption of the received signals by intercell interference is negligible.

In an environment with multipath propagation, this method clearly determines a propagation path with good transmission characteristics and concentrates the transmission power of the base station physically on this propagation path. However, using this approach, it is impossible to prevent the possibility of interference on this transmission path leading to signal cancellation, and hence to interruptions in the transmission, in the short term.

The recommendations from the 3GPP (3rd Generation Partnership Project, 3gpp.org) therefore provide methods in which the subscriber station estimates a short-term channel impulse response $h_m$ for the channel from the m-th antenna element to the subscriber station, and calculates weighting factors $w_m$ which intended to be used for weighting the transmission signal before it is transmitted by the m-th antenna element. Corresponding concepts are also dealt with in M. Raitola, A. Hottinen and R. Wichmann, "Transmission diversity in wideband CDMA", which appeared in the Proceedings of the 49th IEEE Vehicular Technology Conf. Spring (VTC 99 Spring), pages 1545–1549, Houston, Tex. 1999.

One serious problem with this procedure is that the vector of the weighting factors which is estimated by the subscriber station must be transmitted to the base station and that, in accordance with the Recommendations from the 3GPP, only a narrow bandwidth of 1 bit per time slot (slot) is available for this purpose. The vectors can thus be transmitted in only a coarsely quantized form. If the channel changes quickly and the weights need to be updated from one time slot to the next, only two different relative phase angles of the antenna elements can be set. If the channel is changing relatively slowly and, for example, four time slots are available for transmission of the vector, 16 different values of the vector can then be represented.

However, the known concepts reach their limits when the number of antenna elements at the base station is greater than 2, since the bandwidth which is required for transmission of the vector increases with its number of components, that is to say with the number of antenna elements. This means that, although a large number of antenna elements would be desirable on the one hand in order to make it possible to align the transmission beam as accurately as possible, the limited available bandwidth on the other hand means that the weighting vector cannot be updated sufficiently often as would be necessary for matching to fast fading.

SUMMARY OF THE INVENTION

The invention is based on the object of specifying an improved method for beamforming which allows more reliable forming of the downlink beam.

The method according to the invention for data transmission is used in a radio communications system having a base station and subscriber stations. The subscriber stations are, for example, mobile stations, that is to say in a mobile radio network, or fixed stations, that is to say in so-called subscriber access networks for wire-free subscriber access. The base station has an antenna device (smart antenna) with a number of antenna elements. The antenna elements allow directional reception and directional transmission of data via the radio interface.

The method according to the invention distinguishes between an initialization phase, which is in each case carried out at relatively long time intervals corresponding to a large number of time slots for the relevant subscriber station, and a working phase, which is carried out more frequently, for example up to once per time slot. In the initialization phase, a number of so-called first weighting vectors are determined, which are used in a subsequent working phase in the radio communications system in order to define a current weighting vector, which is actually used for beamforming, as new in each case, for each cycle of the working phase. The processing complexity associated with the determination of the weighting vectors thus occurs only relatively rarely, in the initialization phases; the definition of the current weighting vector, which, for example, requires only a choice or the formation of a linear combination of the first weighting vectors, can in contrast be carried out as frequently as necessary in order to compensate for transmission interruptions caused by fast fading.

A first preferred refinement of the method provides for the first weighting vectors to be determined on the basis of measurements of the downlink transmission. This procedure is particularly expedient for radio communications systems which use different frequencies for the uplink and downlink since, in radio communications systems such as these, fast signal fading at the different frequencies is not correlated. Furthermore, operations in the method according to the invention, which are carried out both for determining the first weighting vectors in the initialization phase and for redefinition of the current weighting vectors in the working phase, therefore need be carried out only at the subscriber station. This avoids the processing complexity being duplicated, and circuit components for carrying out the method need also be provided only once, at the subscriber station.

In this case, the first weighting vectors determined at the subscriber station are expediently transmitted to the base station in the initialization phase, and the redefinition of the current weighting vector is carried out in the working phase, by the subscriber station selecting a dominant weighting vector from the determined first weighting vectors and transmitting a designation of the selected dominant weighting vector to the base station. Since this transmission need not take place in each individual time slot of the subscriber station, a dedicated channel can be allocated to it at times, or the transmission of user data such as speech from the subscriber station to the base station can be interrupted or constrained in individual time slots, in order to create transmission bandwidth for the transmission of the weighting vectors. These weighting vectors can thus be transmitted with considerably better resolution than is possible with the conventional methods, with the transmission bandwidth of 1 bit per time slot.

The weighting vectors in each case correspond to emission directions of the antenna device of the base station. Fast fading can admittedly lead to short-term adverse effects on the transmission on such a directional propagation path; the directions themselves in which the downlink signal must be emitted in order to reach the subscriber station will change only slowly, however, even if the subscriber station is moving, for example over a time scale of seconds to minutes. The weighting vectors which are transmitted to the base station can thus be used over a time period of appropriate length for the beamforming, even if the weighting vectors at any given time do not all allow high-quality transmission. If the transmission quality of a weighting vector which is used at a given time deteriorates, the base station must change at short notice to a different weighting vector which allows satisfactory transmission, or the best possible transmission. This weighting vector is in this case referred to as a dominant weighting vector. Since the individual coefficients of this weighting vector are already known at the base station, they no longer need be transmitted individually in the working phase, and it is sufficient to transmit only one designation which allows the base station to select the dominant weighting vector desired by the subscriber station from those stored in it, and to use this for transmission. The amount of information which is required for transmitting such a designation is completely independent of the resolution with which the coefficients of the weighting vectors have been transmitted in the initialization phase, and it is also independent of the number of coefficients of each vector, that is to say it is independent of the number of antenna elements in the antenna device at the base station. This amount of information increases only logarithmically with the number of weighting vectors which are transmitted to the base station. This means that high-precision beamforming is possible in the working phase of the subscriber station, with a minimal bandwidth requirement for transmission of the designation.

A first spatial covariance matrix of the received downlink signal is preferably produced in the initialization phase, and eigen vectors of this first covariance matrix are determined, and are transmitted as weighting vectors to the base station.

This first covariance matrix can be produced as standard for the entire downlink signal received by the subscriber station. Since the individual components of the downlink signal received by the subscriber station differ not only in the path that they have traveled but also in the delay time required for this path, it is more appropriate for the first covariance matrix to be produced individually for each tap of the downlink signal.

Those eigen vectors of the totality of eigen vectors of the first covariance matrix or matrices which have the highest eigen values are preferably determined, since these correspond to the propagation paths with the least attenuation.

In order to obtain a representative conclusion about the quality of the individual transmission paths, it is also expedient for each first covariance matrix to be averaged over a large number of time slots in the downlink signal.

In order to determine that weighting vector which is the most suitable at any given time in the working phase, a second spatial covariance matrix is preferably produced, and the eigen vector that is chosen from the determined eigen vectors as being the dominant weighting vector is that which has the highest eigen value with the second covariance matrix. This second spatial covariance matrix may be produced from new, for example for each time slot allocated to the subscriber station.

In order to make it possible to distinguish between the components from the individual antenna elements when producing the covariance matrices, it is expedient for each antenna element to periodically emit a training sequence, which is known to the subscriber station and is orthogonal with respect to the training sequences of the other antenna elements, and for the weighting vectors to be determined on the basis of the training sequences received by the subscriber station.

One specific refinement allows the number of determined weighting vectors to be two; in this case, one bit is sufficient to identify the respectively dominant weighting vector in the working phase, and this bit can be transmitted in each time slot allocated to the subscriber station.

A greater number of weighting vectors can also be determined, preferably a power of 2n, in which case n bits are required to identify the dominant weighting vector. The transmission of this designation can be distributed over a number of time slots; if a bits are available for transmission in each time slot, n/a time slots are required, and the weighting vector which is specified by the designation is inserted into the n/a time slots which immediately follow the complete transmission of the designation.

A second preferred refinement allows the first weighting vectors to be determined on the basis of measurements of the uplink transmission. This procedure has the advantage that there is no need to transmit the coefficients of the first weighting vectors from the subscriber station to the base station. A method such as this is therefore more compatible with existing mobile radio systems, which do not provide such transmission.

Although the fast fading in mobile radio systems which use different frequencies for the uplink and downlink is different for the two transmission directions, this does not, however, have any disturbing influence on the determination of the first weighting vectors, if the latter are obtained by time averaging, in particular on the basis of an averaged covariance matrix.

In this case as well, it is preferable for the first weighting vectors in each case to be eigen values of a covariance matrix, since these eigen values in each case correspond to an individual propagation path for the radio signal which is interchanged at the same time, possibly on a number of different paths, between the base station and the subscriber station. If a direct propagation path (LOS, line of sight) exists between the subscriber station and the base station, which the base station can determine from the reception statistics of the uplink signal, then it is sufficient for it to transmit the downlink signal weighted with a single weighting vector corresponding to this transmission path. In this way, the transmission power of the base station is specifically directed at the direct transmission path, while other transmission paths of poorer quality are not deliberately supplied with transmission power.

If there is no direct transmission path, a linear combination of first weighting vectors may be used as the current weighting vector. This corresponds to deliberately sharing of the transmission power of the base station between a limited number of transmission paths corresponding to the number of current weighting vectors included in the linear combination. If, in a situation such as this, one of the transmission paths fails at short notice due to fast fading, there is a high probability that at least one other weighting vector in the linear combination will correspond to a transmission path whose quality is useable. This is particularly true when the first weighting vectors are the eigen vectors of the covariance matrix since, with these first weighting vectors, the probabilities of destructive interference are statistically uncorrelated.

In order to achieve as good a signal-to-noise ratio as possible during such a transmission using a linear combination of eigen vectors, the coefficients of the linear combination for a first weighting vector may be chosen to be greater the greater its eigen value.

If the downlink signal delay is identical on two transmission paths, the subscriber station is unable directly to keep these two transmission paths for the signal received by it separate from one another. It is thus possible for these two components to be in antiphase at the subscriber station location, and hence to cancel one another out. Such mutual cancellation can be reliably avoided by producing a number of downlink signals at the base station from a user data sequence intended for that subscriber station, which downlink signals each have a different space time block coding, and each of these downlink signals is transmitted weighted with a different current weighting vector. In this way, each propagation path has a characteristic associated space time block coding, which makes it possible to distinguish between the components of the different transmission paths in all circumstances.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
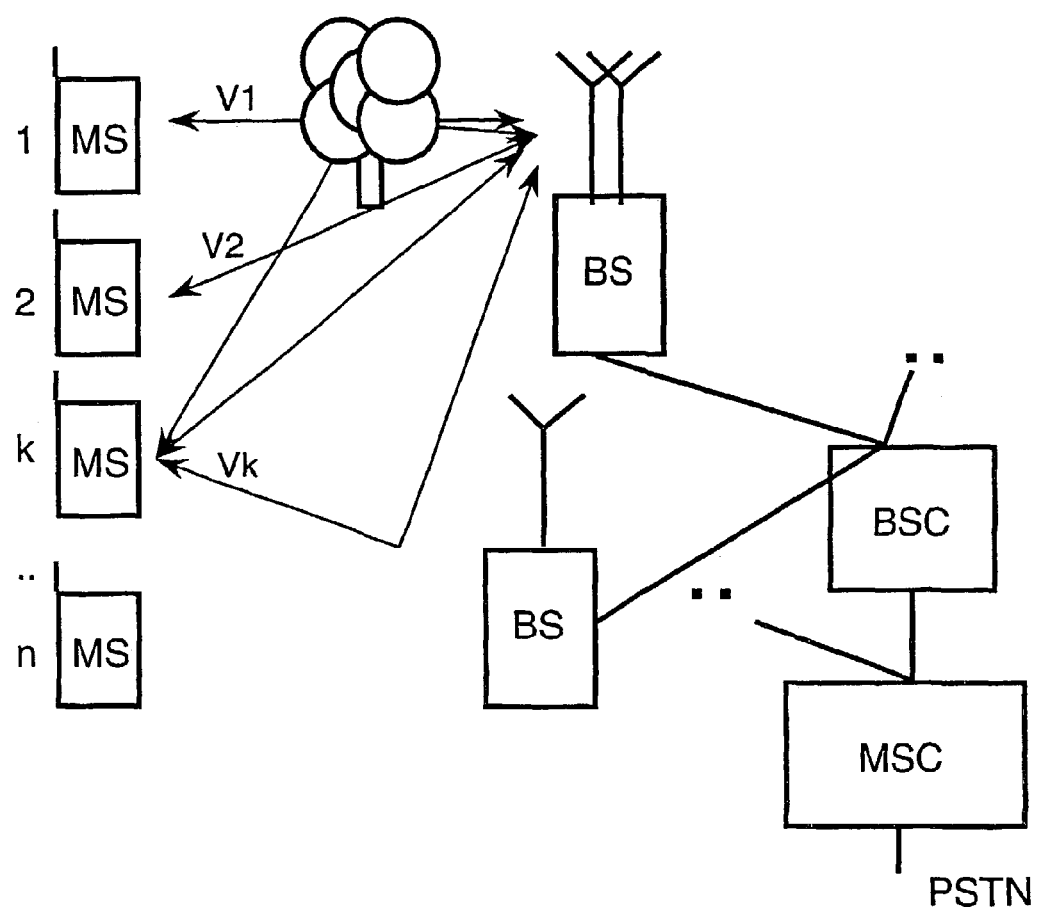
FIG. 1 is a block diagram of a mobile radio network.

Reference will now be made in detail to the preferred embodiments of the present invention, examples of which are illustrated in the accompanying drawings, wherein like reference numerals refer to like elements throughout.

FIG. 1 shows the structure of a radio communications system in which the method according to the invention can be used. This system includes a large number of mobile switching centers MSC, which are networked with one another and provide the access to a landline network PSTN. Furthermore, these mobile switching centers MSC are connected to in each case at least one base station controller BSC. Each base station controller BSC in turn allows a connection for at least one base station BS. A base station BS such as this can set up a message link to subscriber stations MS via a radio interface. At least some of the base stations BS are for this purpose equipped with antenna devices AE which have a number of antenna elements (A1–AM).

FIG. 1 shows, by way of example, connections V1, V2, Vk for transmitting user information and signaling information between subscriber stations MS1, MS2, MSk, MSn and a base station BS. An operation and maintenance center OMC provides control and maintenance functions for the mobile radio network, or for parts of it. The functionality of this structure can be transferred to other radio communications systems in which the invention can be used, in particular for subscriber access networks with wire-free subscriber access.

Figure 2:
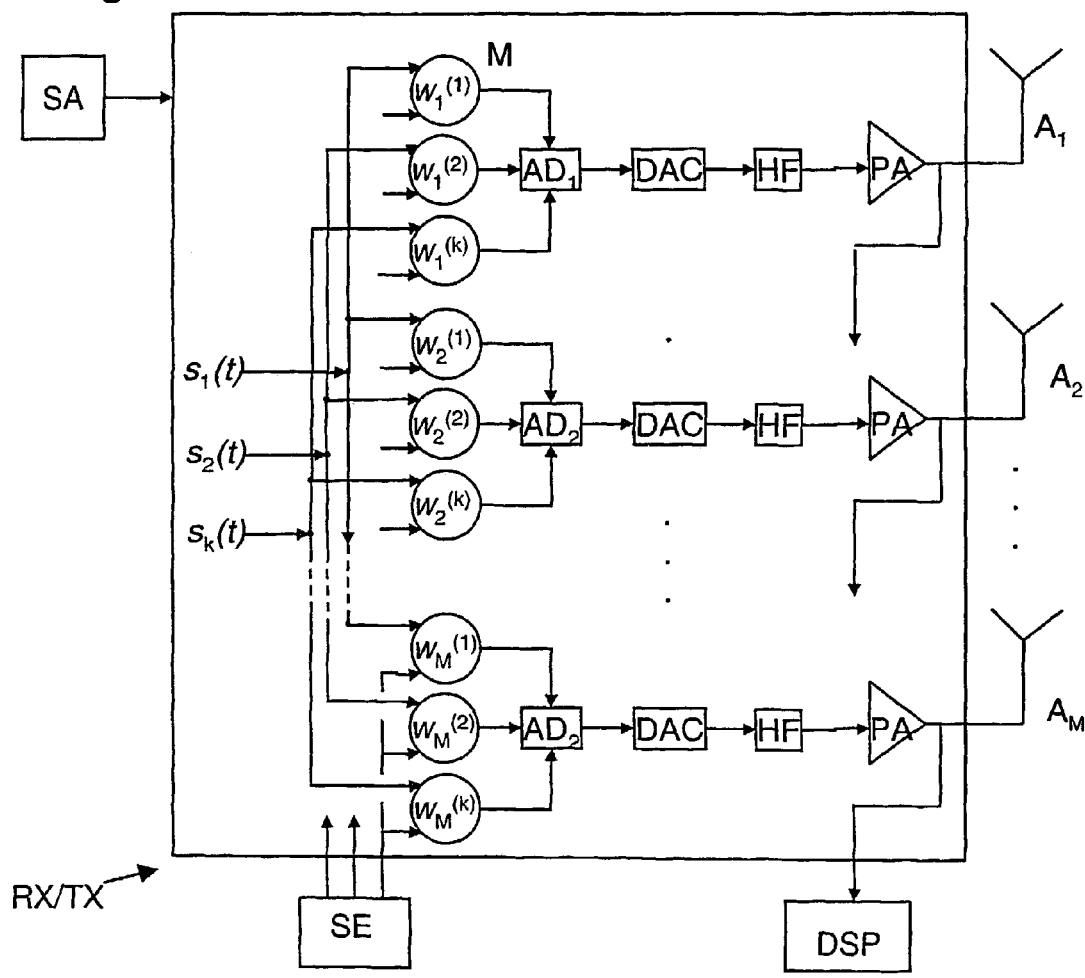
FIG. 2 is a block diagram of the base station.

FIG. 2 shows, schematically, the design of a base station BS. A signal production device SA assembles the transmission signal, which is intended for the subscriber station MSk, into radio blocks, and allocates this signal to a frequency channel TCH. A transmitting/receiving device TX/RX receives the transmission signal $s_k(t)$ from the signal production device SA. The transmitting/receiving device TX/RX includes a beamforming network, in which the transmission signal $s_k(t)$ for the subscriber station MSk is logically linked with transmission signals $s_1(t), s_2(t), \ldots$ which are intended for other subscriber stations and to which the same transmission frequency is allocated. For each subscriber signal and each antenna element, the beamforming network has a multiplier M, which multiplies the transmission signal $s_k(t)$ by a component $w_m^{(k)}$ of a weighting vector $w^{(k)}$, which is allocated to the receiving subscriber station MSk. The output signals from the multipliers M which are in each case allocated to one antenna element $A_m$, m=1, . . . , M are added by an adder $AD_m$, m=1,2, . . . , M, are converted to analog form by a digital/analog converter DAC, are converted to the transmission frequency (RF) and are amplified in a power amplifier PA before they reach the antenna element ($A_1$, . . . , $A_M$). A structure which is analogous to the described beamforming network but is not shown specifically in FIG. 2 is arranged between the antenna elements ($A_1$, $A_2$, . . . , $A_M$) and a digital signal processor DSP, in order to break down the received mixture of uplink signals into the components for the individual subscriber stations, and to supply these separately to the DSP.

A memory device SE contains a set of weighting vectors $w^{(k,1)}$, $w^{(k,2)}$, . . . for each subscriber station MSk, from which the weighting vector $w^{(k)}$ which is used by the multipliers M is selected.

Figure 3:
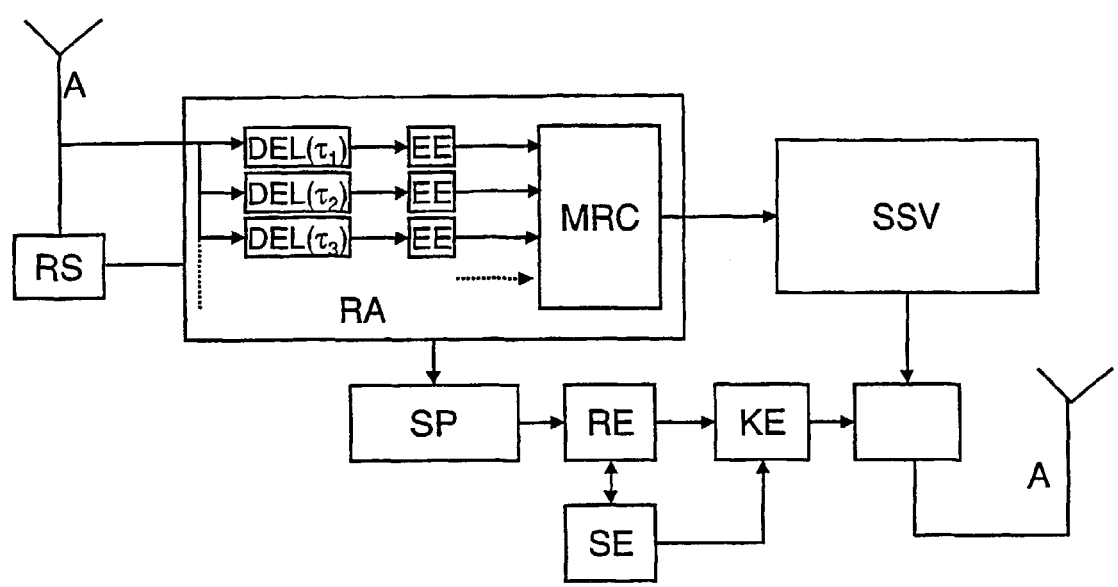
FIG. 3 is a block diagram of the subscriber station.

FIG. 3 shows, schematically, the design of a subscriber station MSk for carrying out a first refinement of the method according to the invention. The subscriber station MSk has a single antenna A, which receives the downlink signal emitted from the base station BS. After being converted to baseband, the received signal is supplied from the antenna A to a so-called rake searcher RS, which is used to measure delay time differences between the components of the downlink signal, which have reached the antenna A on different propagation paths. The received signal is furthermore applied to a rake amplifier RA, which has a number of rake fingers, three of which are illustrated in FIG. 3, and each of which has a delay element DEL and a despreader/descrambler EE. The delay elements DEL in each case delay the received signal by a delay value $\tau_1$, $\tau_2$, $\tau_3$, . . . , which is supplied by the rake searcher RS. The despreaders/descramblers EE each produce a sequence of estimated symbols at their outputs, and the results of the estimation process for the individual descramblers may be different owing to the different phase angles of the downlink signal with respect to the descrambling and spreading code in the individual fingers of the rake amplifier.

The symbol sequences produced by the despreaders/descramblers EE also include the results of the estimation of training sequences which are emitted by the base station, and which are characteristic and quasi-orthogonal for each antenna element of the base station. A signal processor SP is used to compare the results of the estimation of these training sequences with the symbols which are known to the subscriber station and are actually contained in the training sequences. This comparison can be used to determine the impulse response of the transmission channel between the base station BS and the subscriber station MSk for each individual finger or tap. The outputs of the despreaders/descrambler EE are also connected to a maximum ratio combiner MRC, which assembles the individual estimated symbol sequences to form a combined symbol sequence with the best-possible signal-to-noise ratio, which it supplies to a speech signal processing unit SSV. The method of operation of this unit SSV, which converts the received symbol sequence into a signal which is audible by a user and converts received tones to a transmission symbol sequence, is well known and does not need to be described here.

Figure 4:
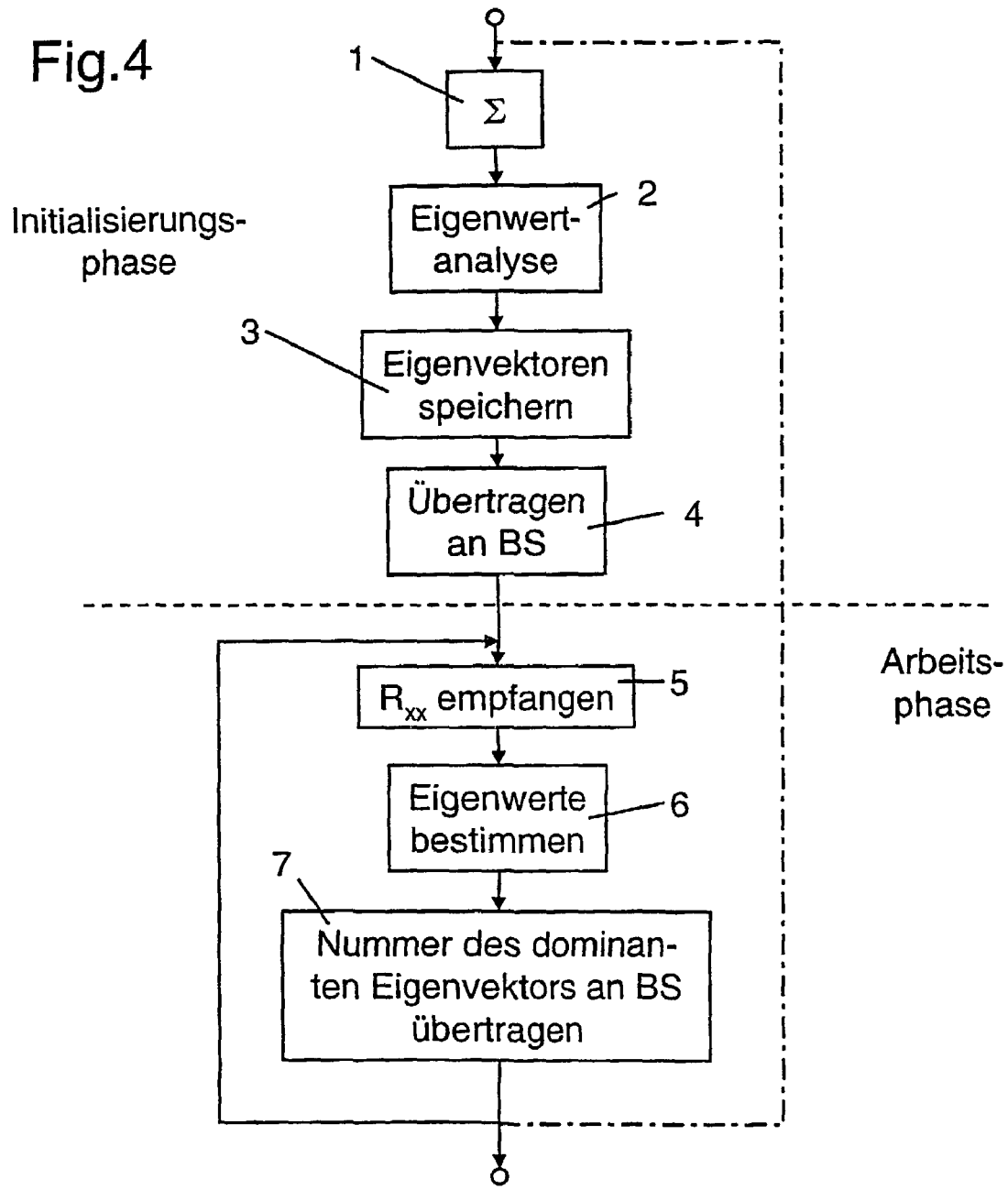
FIG. 4 is a flowchart of the method according to a first refinement.

The signal processor SP determines the impulse responses of each antenna element AE1, . . . , AEM individually for each tap, and combines these impulse responses in the manner which is known, for example, from the cited DE 198 03 188 to form a spatial covariance matrix, $R_{xx}$. These spatial covariance matrices are passed to a computation unit RE, whose method of operation will be described with reference to the flowchart shown in FIG. 4.

In an initialization phase 1, the computation unit RE adds a large number of supplied covariance matrices separately for each tap and forms a mean value of the covariance matrices. This is followed by an analysis 2 of the eigen values and eigen vectors of the averaged covariance matrices obtained for the various taps.

The analysis may extend into all the eigen vectors and values of the covariance matrix and, in the case under consideration here, a control unit KE determines a limited number, for example 2 or 4, of the eigen vectors found in the analysis process which have eigen values with the largest magnitudes and which in consequence correspond to the transmission paths with the least attenuation. Alternatively, it is possible to use a method for eigen vector analysis which produces the eigen vectors of the covariance matrix in the sequence of decreasing magnitudes of the eigen values, and which is terminated once the limited number of eigen values have been determined.

The coefficients of the determined eigen vectors $w^{(k,1)}$, $w^{(k,2)}$, . . . are combined with the user datastream coming from the speech processing unit SSV and are transmitted 4 via the antenna A to the base station. The base station stores them in its memory unit SE for use as coefficients for the multipliers M for the beamforming network.

The computation unit RE now switches to a working phase, in which it in each case receives 5 these covariance matrices $R_{xx}$ from the signal processor SP in each case related to an individual time slot of the subscriber station and multiplies them by each of the eigen vectors which are stored in the memory unit and are transmitted to the base station, in order to determine 6 the eigen values of these vectors for the relevant covariance matrix. The number of the eigen vector which has the greater eigen value is transmitted 7 to the base station via the control unit KE in. This eigen vector is identified as dominant eigen vector since it makes the greatest contribution, and generally the best contribution, to the received signal. If only two determined eigen vectors are stored in the memory element SE and have been transmitted to the base station, one bit is sufficient to identify the eigen vector with the respectively greater eigen value. In consequence, if one bit is available per time slot for feeding back the reception characteristics to the base station, the vector which is used for beamforming by the base station can be updated in each time slot and can be used for beamforming in the next time slot.

If four eigen values have been transmitted to the base station, two bits are required to identify the respective dominant eigen vector. If one bit is available per time slot for transmitting the reception characteristics back, two time slots are thus required in order to transmit the complete identification of the dominant vector. In consequence, this is used for beamforming for the two time slots following its transmission; the identification to be used subsequently is transmitted in the course of these two slots.

The working phase operations may be repeated cyclically many times before the initialization phase need be carried out once again, in order to update the coefficients of the eigen vectors.

To assist understanding, a distinction has been drawn above between the initialization phase and the working phase. However, this does not mean that the two phases have to be carried out at separate times from one another. For example, it is possible and expedient to bracket the two phases with one another in that the computation unit RE with a received covariance matrix $R_{xx}$ firstly determines 6 the eigen values, and secondly uses this matrix to form 1 a running mean value of the covariance matrixes. This ensures that an up-to-date averaged covariance matrix is available at all times, and can be used to carry out the eigen value analysis 2.

Figure 5:
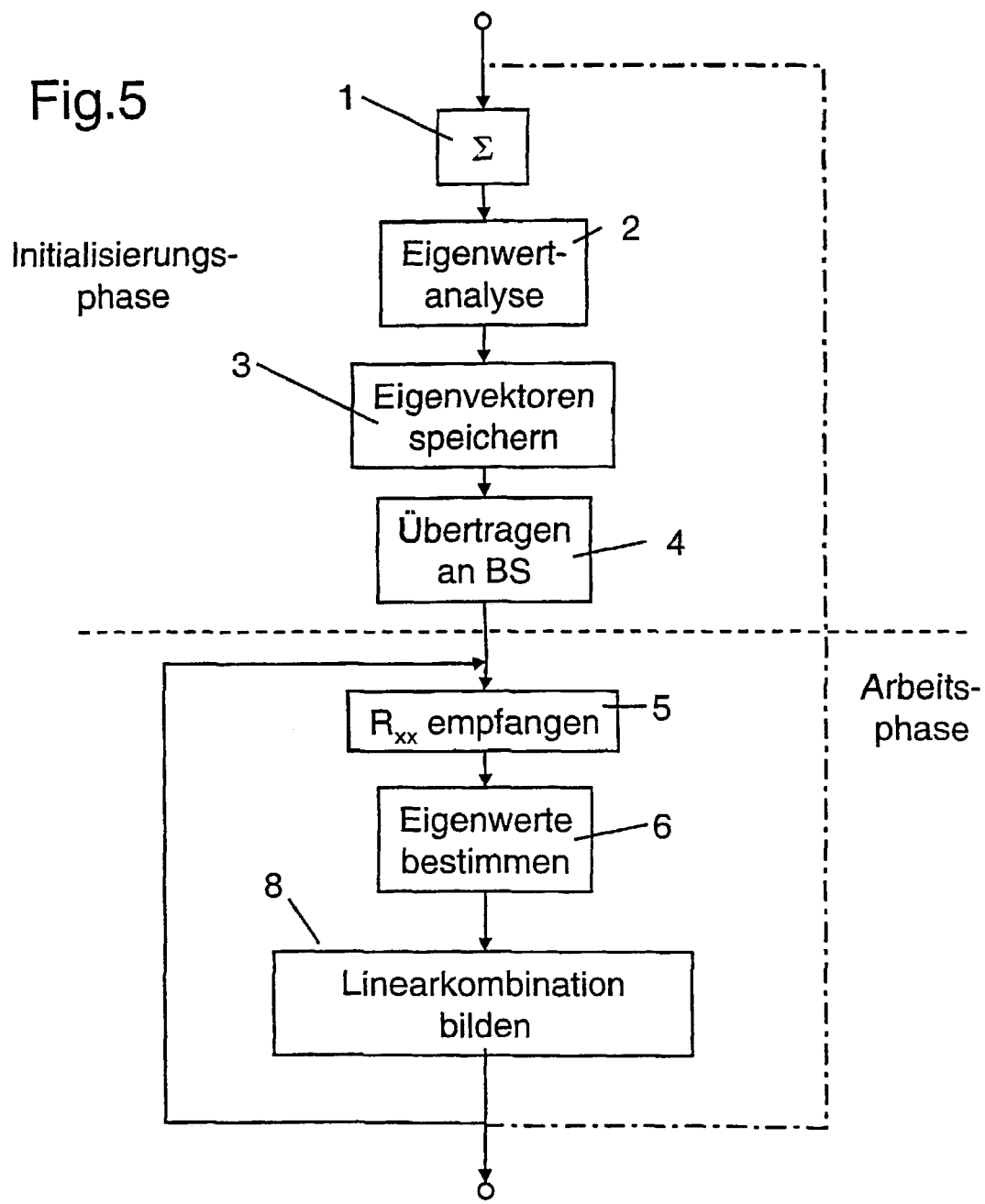
FIG. 5 is a flowchart of the method according to a second refinement.

A second refinement of the method according to the invention will be described with reference to FIG. 5. In this refinement, the first weighting vectors are determined on the basis of measurements of the uplink transmission from a subscriber station MSk to the base station BS. For this purpose, the base station BS is equipped with components analogous to the rake searcher RS, rake amplifier RA, signal processor SP, computation unit RE, memory element SE etc., described with reference to FIG. 3 for the subscriber station.

The computation unit RE forms 1 an averaged covariance matrix for each individual tap of the uplink signal, and determines the eigen vectors and eigen values of the covariance matrix obtained in this way. These eigen values in each case correspond to one transmission path and contain the information relating to the relative phase angles of the corresponding magnitude of the uplink signal to the individual antenna elements, and hence relating to the direction from which that component is received. If the frequencies of the uplink and downlink in the radio communications system under consideration are the same, the phase information contained in the eigen vector can be used directly for weighting the downlink signal. If the frequencies of the uplink and downlink are different, then it is necessary to convert the phase information contained in the eigen vector on the basis of the uplink frequency to an appropriate direction, and in turn to convert this direction on the basis of the downlink frequency to phase information, in order to obtain eigen vectors which are suitable for beamforming in the downlink.

The analysis 2 also includes the determination of the eigen values of the eigen vectors. The magnitude of the eigen vector is a measure of the quality of each individual transmission path; a given number of, for example, 2 or 4 eigen vectors are thus chosen for subsequent use and are stored 3, these being the eigen vectors whose eigen values have the highest magnitude of the eigen vectors which have been found.

In the subsequent working phase, the computation unit cyclically receives covariance matrices from the signal processor, with each covariance matrix being related to in each case one individual tap of the uplink signal. The eigen vectors which are stored in the memory unit SE themselves each correspond to one specific tap. The computation unit determines 6 the current eigen value for each stored eigen vector by multiplying it by the covariance matrix which is produced 5 and corresponds to the same tap as the eigen vector. The eigen value that is obtained provides a measure of the transmission quality on the transmission path which corresponds to that eigen vector, with a time resolution which corresponds to the rate of production of the covariance matrices in the working phase. In this phase, the covariance matrices are produced in real time in each case by the signal processor for each time slot allocated to that subscriber station; the eigen value is thus a measure of the transmission quality of the transmission path, taking account of fast fading.

In a first simple variant of the method, this is followed by calculating 8 a current weighting vector $w^{(k)}$ by forming a linear combination of the stored eigen vectors $w^{(k,1)}$, $w^{(k,2)}$, ..., with each of the eigen vectors $w^{(k,1)}$, $w^{(k,2)}$, ... being included in the linear combination multiplied by its eigen value or its magnitude that is obtained 6. The linear combination can be normalized. This weighting in the formation of the linear combination ensures that those transmission paths which have the best transmission characteristics in the short term dominate the downlink signal which is emitted by the base station. The other eigen vectors which are included in the current weighting vector $w^{(k)}$ are used to ensure that a useable signal arrives at the subscriber station even in a situation where the most highly weighted transmission path changes from one time slot to the next.

If one of the transmission paths between the base station and the subscriber station is a direct link, then this can be identified for the base station by the fact that the corresponding component of the received uplink signal has relatively little phase fluctuation and, generally, little attenuation either. If such a direct transmission path exists, the associated eigen vector can be used directly as the current weighting vector $w^{(k)}$, in other words all the other eigen vectors are included in the formation of the linear combination with coefficients of 0.

Figure 6:
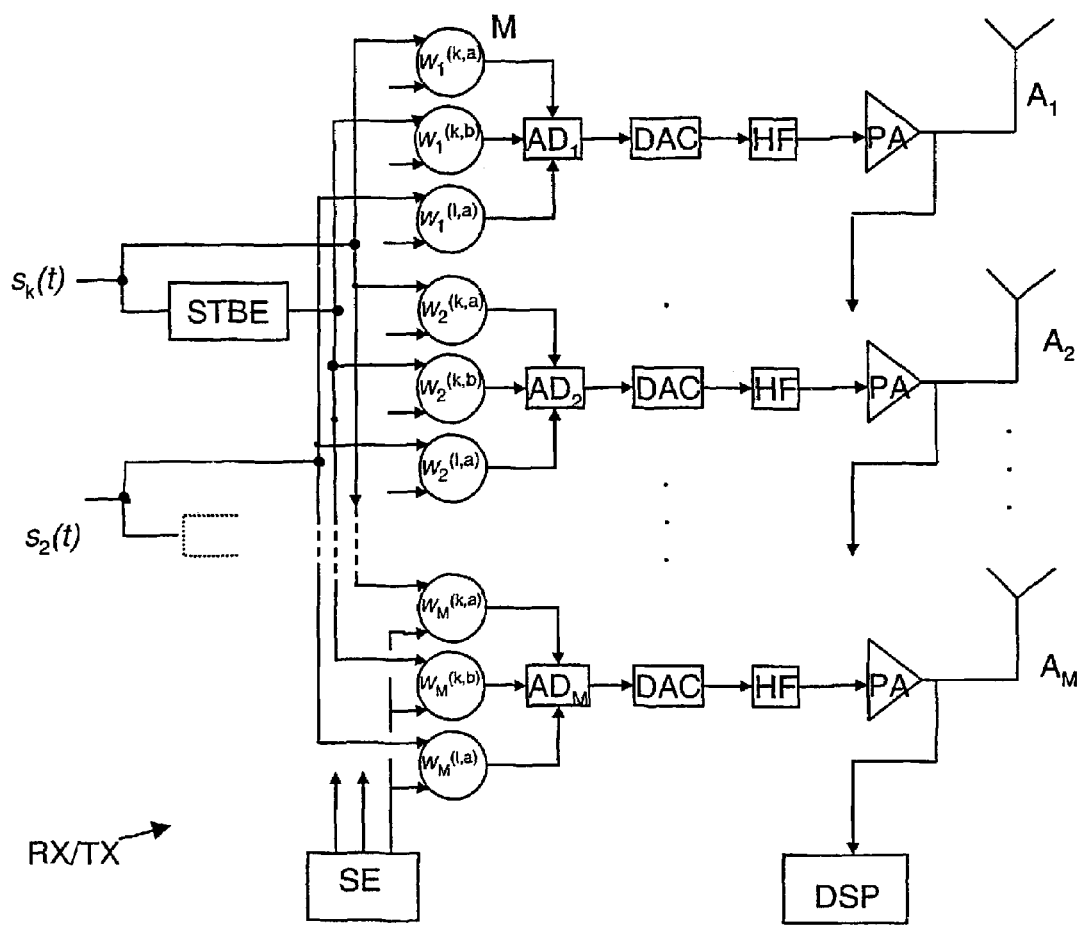
FIG. 6 is a block diagram of a transmitting/receiving device in the base station.

A further-developed variant of the second refinement is predicated on a base station having an antenna device having a number of antenna elements, which is able to transmit using space time block codes. Codes such as these are known, for example from Tarokh et al., Space-Time Block Codes from Orthogonal Designs, IEEE Trans. on Information Theory, Volume 45 No. 5, July 1999. A detail of the transmitting/receiving device Tx/Rx from such a base station is shown in FIG. 6. In this transmitting/receiving device, a complex-value symbol sequence which is intended for the subscriber station MSk is subdivided into two branches, one of which contains a Space Time Block Encoder STBE, which in this case reverses the sequence, conjugates and reverses the mathematical sign of one symbol of two successive symbols in the symbol sequence sk(t). The two different symbol sequences obtained in this way but having the same information content are weighted in a beamforming network, whose design is described analogously to that with reference to FIG. 2 and will therefore not be dealt with in any more detail here, with two different eigen vectors $w^{(k,a)}$, $w^{(k,b)}$ from the set of eigen vectors $w^{(k,1)}$, $w^{(k,2)}$, ... ($w^{(k,a)} = (w_1^{(k,a)}, w_2^{(k,a)}, ..., w_m^{(k,a)})$, which are additively superimposed and are transmitted. The individual antenna elements ($A_1, ... A_M$) are thus able to transmit a mixture of signals which have different space time block coding. The coding is thus not specific for an individual antenna element but for a propagation path a or b, which corresponds to the respective eigen vector $w^{(k,a)}$ or $w^{(k,b)}$ used for weighting. This ensures that signals which reach the subscriber station MSk on these two different transmission paths a, b can never interfere destructively even if their relative delay disappears. In the variant of the second refinement of the method which uses this transmitting/receiving device, the formation 8 of a linear combination is thus replaced by the space time block coding. Apart from this, the method in both variants correspond; in particular, both variants have the capability to interchange those of the stored eigen vectors which are included in the linear combination or are used for weighting the space time block-coded signals, from one cycle of the working phase to the next.

Modifications of the refinements described here based on the disclosure provided here are within the knowledge of those skilled in the art. In particular, a variant is conceivable in which the eigen vectors are determined on the uplink signal, as described with reference to the second refinement, and in which the determined eigen values are transmitted from the base station to the subscriber station, so that the subscriber station can carry out the method from receiving 5 to transmitting 7, as described with reference to FIG. 4 for the first refinement of the method.

The invention has been described in detail with particular reference to preferred embodiments thereof and examples, but it will be understood that variations and modifications can be effected within the spirit and scope of the invention.

The invention claimed is:

1. A method for beam formation in a radio communication system with subscriber stations and a base station, the base station having an antenna system with a plurality of antenna elements which radiate a downlink signal weighted in each case with coefficients $w_i$ of an actual weighting vector w, where i=1, . . . , M, comprising:
   at a subscriber station in an initialization phase thereof,
      producing a first spatial covariance matrix of a received downlink signal, based on averaging over a plurality of time slots of the received downlink signal,
      obtaining eigenvectors of the first spatial covariance matrix, and
      transferring the eigenvectors to the base station as initial weighting vectors for storage in memory;
   at the subscriber station in a working phase thereof,
      repeatedly selecting a dominant weighting vector from the initial weighting vectors, and
      conveying an identifier of the dominant weighting vector to the base station; and
   at the base station in the working phase,
      selecting the dominant weighting vector from among at least the initial weighting vectors stored in memory during the initialization phase of the subscriber station, and
      using the dominant weighting vector to form a direction of emission.

2. A method according to claim 1, wherein said producing produces the first spatial covariance matrix individually for each tap of the received downlink signal.

3. A method according to claim 2, wherein said selecting selects the dominant weighting vector as having a largest eigenvalue among the eigenvectors of at least the first spatial covariance matrix.

4. A method according to claim 3, wherein said selecting the dominant weighting vector in the working phase of the subscriber station comprises:
   cyclically producing a second spatial covariance matrix; and
   selecting as the dominant weighting vector an eigenvector of the second spatial covariance matrix having a largest eigenvalue.

5. A method according to claim 4,
   further comprising periodically radiating from each antenna element of the base station a training sequence orthogonal to training sequences of other antenna elements, and
   wherein said obtaining of the initial weighting vectors is based on the training sequences received by the subscriber station.

6. A method according to claim 5,
   wherein said obtaining obtains two of the initial weighting vectors, and
   wherein the identifier of the dominant weighting vector is transferred in each time slot allocated to the subscriber station.

7. A method according to claim 6, further comprising inserting identification of beam formation in a time slot directly following transmission of the dominant weighting vector.

8. A method according to claim 5,
   wherein said obtaining obtains $2^n$ of the initial weighting vectors, where n is an integer greater than one, and
   wherein the identifier of the dominant weighting vector is formed of n bits transmitted in portions of j bits, where j is a positive integer, in consecutive time slots allocated to the subscriber station.

9. A method according to claim 8, further comprising inserting identification of beam formation in n/j time slots directly following transmission of the dominant weighting vector.

10. A method for beam formation in a radio communications system with subscriber stations and a base station, the base station having an antenna system with a plurality of antenna elements which radiate a downlink signal, weighted in each case with coefficients $w_i$ of an actual weighting vector w, where i=1, . . . , M, said method comprising:
   in an initialization phase at the base station,
      producing a first spatial covariance matrix of a received uplink signal, based on averaging over a plurality of time slots of the received uplink signal,
      obtaining eigenvectors of the first spatial covariance matrix, and
      using and storing the eigenvectors as initial weighting vectors; and
   in a working phase,
      repeatedly selecting a dominant weighting vector from at least the initial weighting vectors, and
      using at the base station the dominant weighting vector to form a direction of emission.

11. A method according to claim 10, wherein said producing produces the first spatial covariance matrix individually for each tap of the received uplink signal.

12. A method according to claim 11, wherein said selecting selects the dominant weighting vector as having a largest eigenvalue among the eigenvectors of at least the first spatial covariance matrix.

13. A method according to claim 12, wherein said selecting the dominant weighting vector in the working phase comprises:
   cyclically producing a second spatial covariance matrix; and
   selecting as the dominant weighting vector an eigenvector of the second spatial covariance matrix having a largest eigenvalue.

14. A method according to claim 13,
   further comprising periodically radiating from each subscriber station a training sequence, and
   wherein said obtaining of the initial weighting vectors is based on the training sequences received by the base station.

15. A method according to claim 14, wherein the actual weighting vector is formed from a linear combination of the initial weighting vectors.

16. A method according to claim 15, wherein the coefficients of the linear combination for each initial weighting vector is selected to be greater, the greater its eigenvalue is.

17. A method according to claim 16,
   further comprising producing a plurality of downlink signals from a symbol sequence intended for a subscriber station, each of the downlink signals having a different space-time block coding, and wherein said selecting and using the dominant weighting vector is repeated to vary the dominant weighting vector for each of the downlink signals.

18. A method according to claim 16, wherein said selecting selects the dominant weighting vector from the initial weighting vectors whenever a line-of-sight transmission path exists between the base station and the subscriber station.

* * * * *